(12) United States Patent
Kang et al.

(10) Patent No.: US 12,392,513 B2
(45) Date of Patent: Aug. 19, 2025

(54) HAZARDOUS GAS PURIFICATION DEVICE WITH BUILT-IN PURIFICATION SYSTEM

(71) Applicant: GTScien Co., Ltd., Daejeon (KR)

(72) Inventors: Yeon Kyun Kang, Daejeon (KR); Sung Kwan Je, Daejeon (KR); Man Sung Jeong, Daejeon (KR); Jun Yeon Cho, Daejeon (KR)

(73) Assignee: GTScien Co., Ltd., Daejeon (KR)

( * ) Notice: Subject to any disclaimer, the term of this patent is extended or adjusted under 35 U.S.C. 154(b) by 360 days.

(21) Appl. No.: 17/993,028

(22) Filed: Nov. 23, 2022

(65) Prior Publication Data

US 2023/0235903 A1 Jul. 27, 2023

(30) Foreign Application Priority Data

Jan. 26, 2022 (KR) .................... 10-2022-0011574

(51) Int. Cl.
*F24F 8/80* (2021.01)
*B01D 46/00* (2022.01)
(Continued)

(52) U.S. Cl.
CPC ............ *F24F 8/80* (2021.01); *B01D 46/0086* (2013.01); *B01D 46/44* (2013.01); *B01D 46/442* (2013.01);
(Continued)

(58) Field of Classification Search
CPC .... B01D 46/00; B01D 46/0086; B01D 46/44; B01D 46/442; B01D 46/62; B01D 50/00
See application file for complete search history.

(56) References Cited

U.S. PATENT DOCUMENTS

2006/0277875 A1   12/2006 Schuld

FOREIGN PATENT DOCUMENTS

CN    104833035    8/2015
CN    205351520    6/2016
(Continued)

OTHER PUBLICATIONS

European Search Report and the European Search Opinion Dated Jun. 14, 2023 From the European Patent Office Re. Application No. 22208497.2. (17 Pages).
(Continued)

*Primary Examiner* — Robert A Hopkins

(57) ABSTRACT

A hazardous gas purification device with a built-in purification system is disclosed. The disclosed present invention is characterized in that it comprises a body case provided with an intake port for sucking hazardous gas on the upper side, provided with an exhaust port for discharging purified air to the outside on the lower side, and provided with an accommodating part provided between the intake port and the exhaust port on the inside; a pre-filter for filtering out large particles of dust and foreign substances contained in the hazardous gas introduced through the intake port; and a modular purification system, in a state of being installed in the accommodating part, for sterilizing viruses while filtering hazardous substances and fine particulate foreign substances contained in the hazardous gas introduced through the intake port, wherein the purification system consists of a three-dimensional filter for three-dimensionally filtering volatile organic compounds contained in the hazardous gas passed through the pre-filter from four directions; a pressure-feed fan, in a state of being disposed below the three-dimensional filter, for sucking hazardous gas through the intake port and forcibly discharging purified air through the exhaust port; a UV lamp disposed below the pressure-feed (Continued)

fan and for irradiating the pressure-feed fan and the hazardous gas with ultraviolet rays to sterilize harmful viruses; a HEPA filter disposed below the UV lamp and for filtering fine particles in the hazardous gas that is not filtered by the pre-filter; and a flat plate filter disposed below the HEPA filter and for filtering the remaining amount of volatile organic compounds that are not filtered by the three-dimensional filter.

9 Claims, 6 Drawing Sheets

(51) Int. Cl.
*B01D 46/44* (2006.01)
*B01D 46/62* (2022.01)
*B01D 50/00* (2022.01)
*F24F 8/108* (2021.01)
*F24F 8/158* (2021.01)
*F24F 8/22* (2021.01)
*F24F 11/52* (2018.01)
*F24F 13/28* (2006.01)
*F24F 13/20* (2006.01)

(52) U.S. Cl.
CPC ............ *B01D 46/62* (2022.01); *B01D 50/00* (2013.01); *F24F 8/108* (2021.01); *F24F 8/158* (2021.01); *F24F 8/22* (2021.01); *F24F 11/52* (2018.01); *F24F 13/28* (2013.01); *F24F 2013/205* (2013.01); *F24F 2221/125* (2013.01); *F24F 2221/36* (2013.01)

(56) References Cited

FOREIGN PATENT DOCUMENTS

| | | | | |
|---|---|---|---|---|
| CN | 205878393 U | * | 1/2017 | |
| CN | 205994086 | | 3/2017 | |
| CN | 207006382 U | * | 2/2018 | |
| CN | 208365677 U | * | 1/2019 | ............ F24F 13/28 |
| CN | 210107650 U | * | 2/2020 | |
| KR | 10-2009-0013526 | | 2/2009 | |
| KR | 10-0941666 | | 2/2010 | |
| KR | 10-2013-0054579 | | 5/2013 | |
| KR | 10-1549649 | | 11/2014 | |
| PL | 64462 | | 6/2009 | |
| WO | WO 2017/209684 | | 12/2017 | |

OTHER PUBLICATIONS

Bläker et al. "Investigation of Mechanical, Chemical and Adsorptive Properties of Novel Silicon-Based Adsorbents With Activated Carbon Structure", C Journal of Carbon Research, XP055860336, 3(3): 27-1-27-11, Published Online Aug. 27, 2017.

Curdts et al. "Novel Silica-Based Adsorbents With Activated Carbon Structure", Microporous and Mesoporous Materials, XP093050213, 210: 202-205, Jul. 2015.

Müller et al. "Effectiveness of Filter Columns in Stuttgart's 'Am Neckartor' Area: Final Report", 'Neckartor' Pilot Project, Mann+Hummel, XP093051594, p. 1-52, May 31, 2020.

* cited by examiner

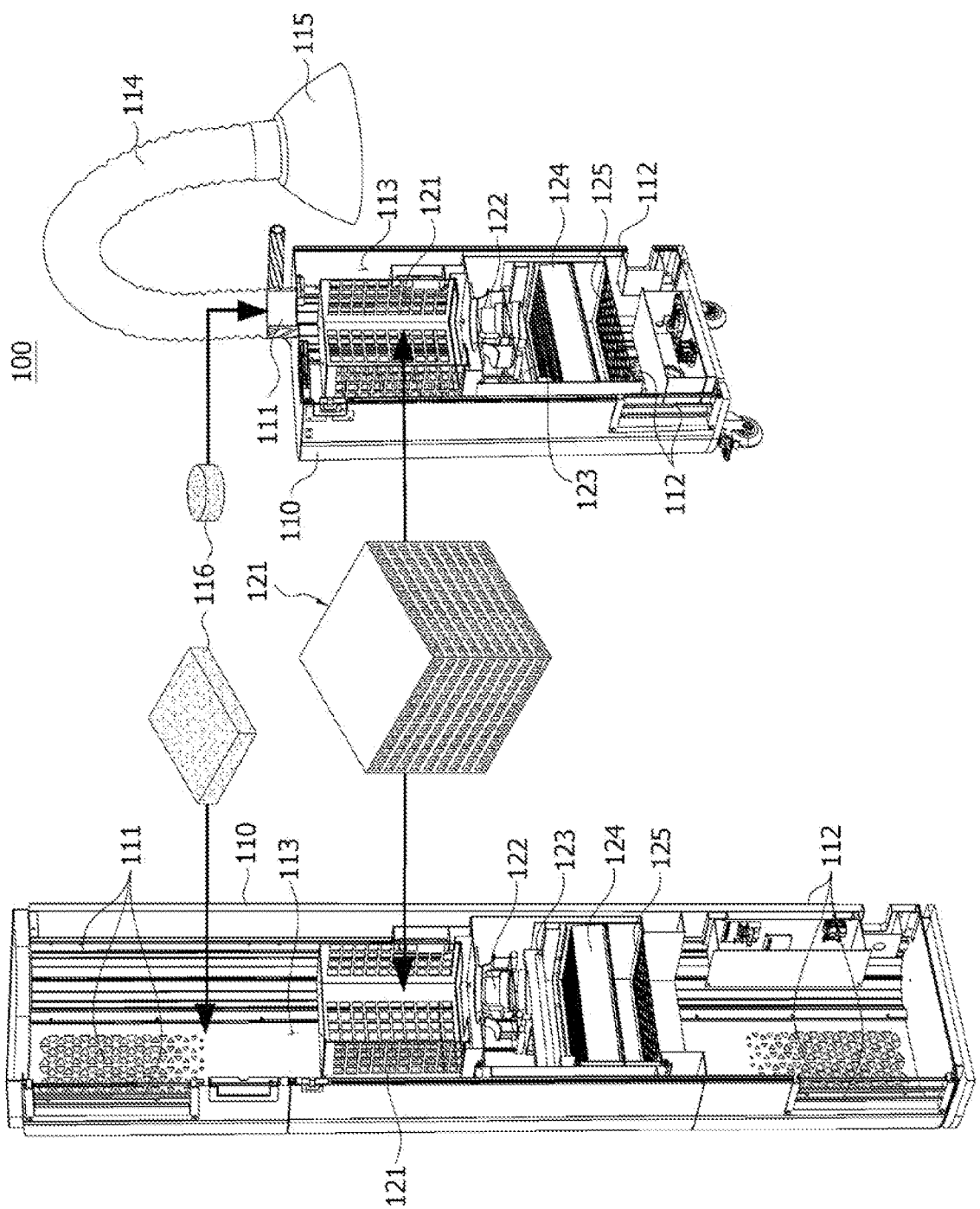
[FIG. 1]

[FIG. 2]
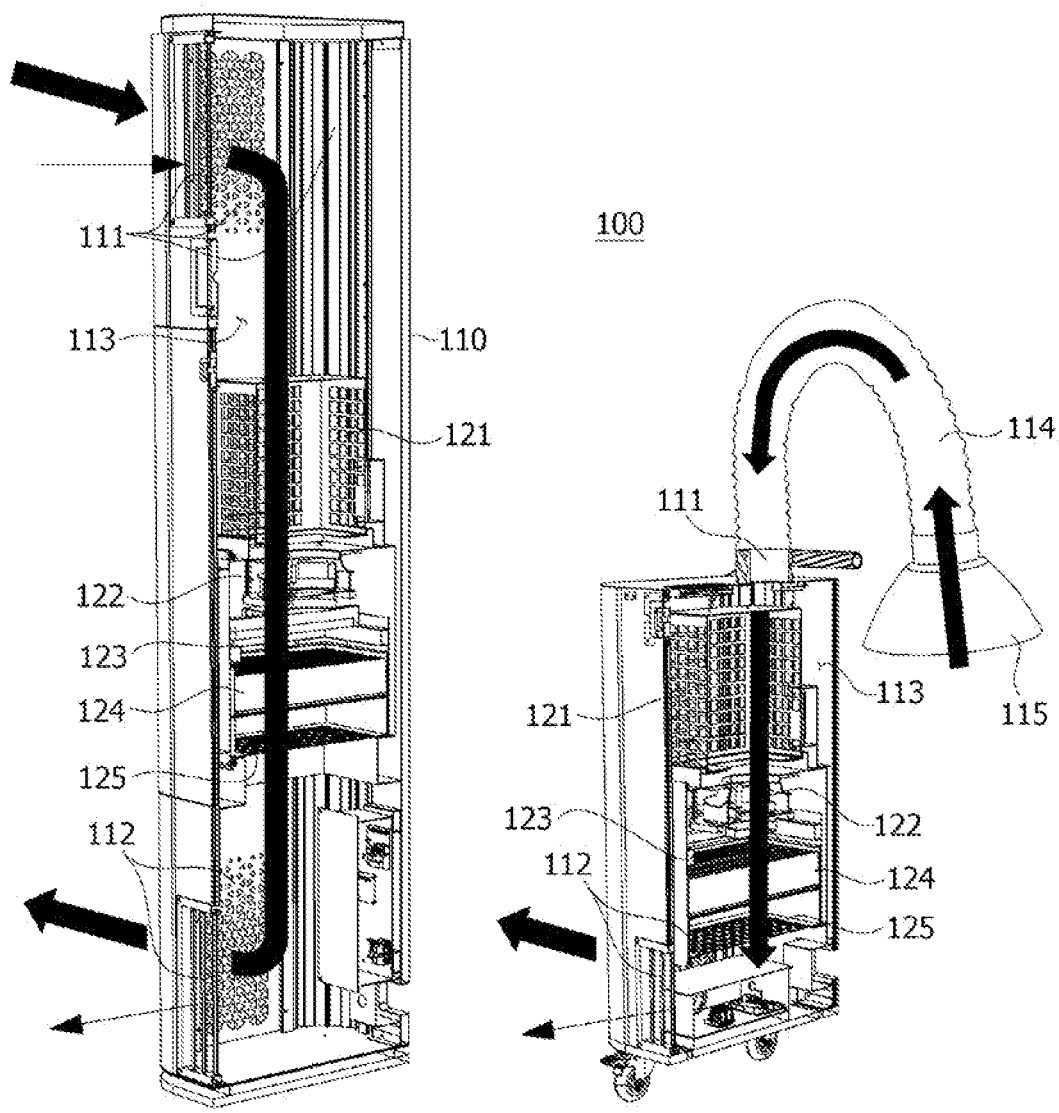

[FIG. 3]
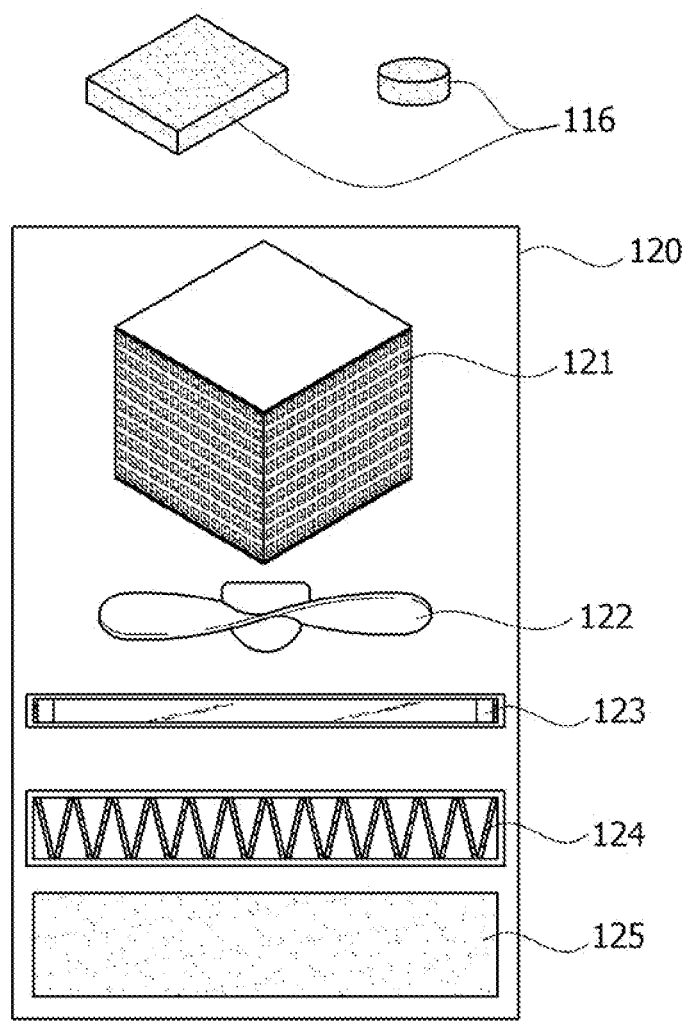

[FIG. 4]
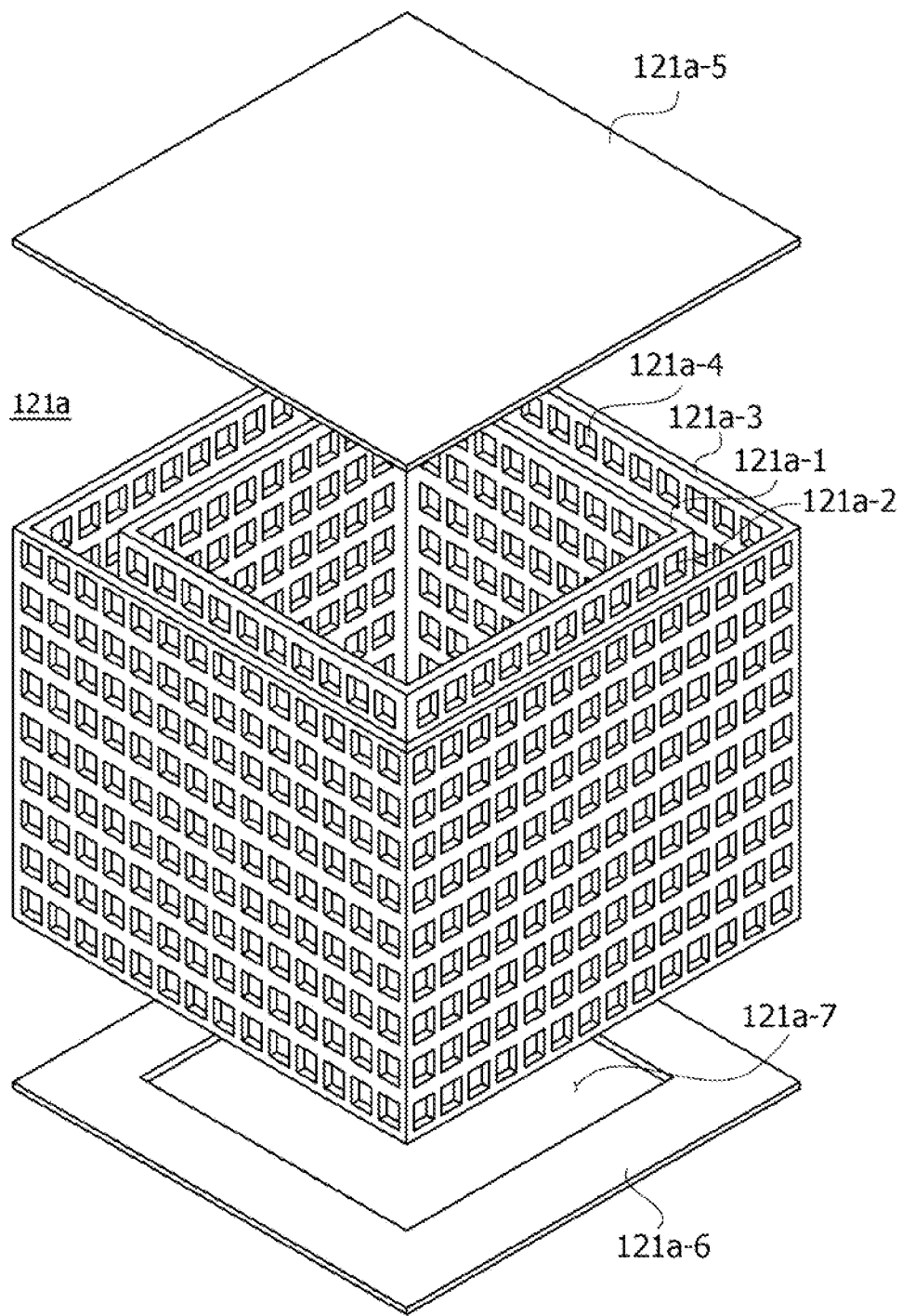

[FIG. 5]
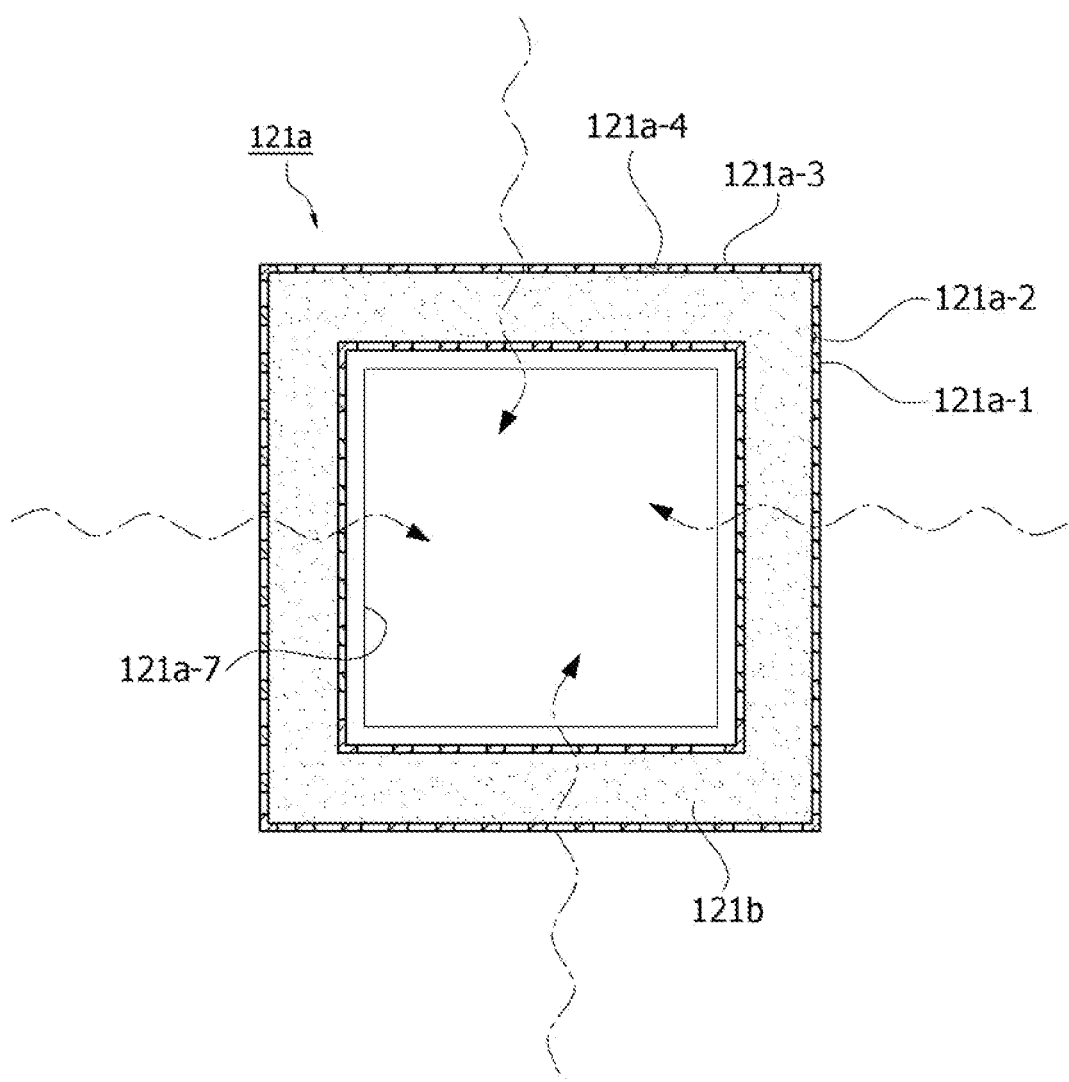

[FIG. 6]
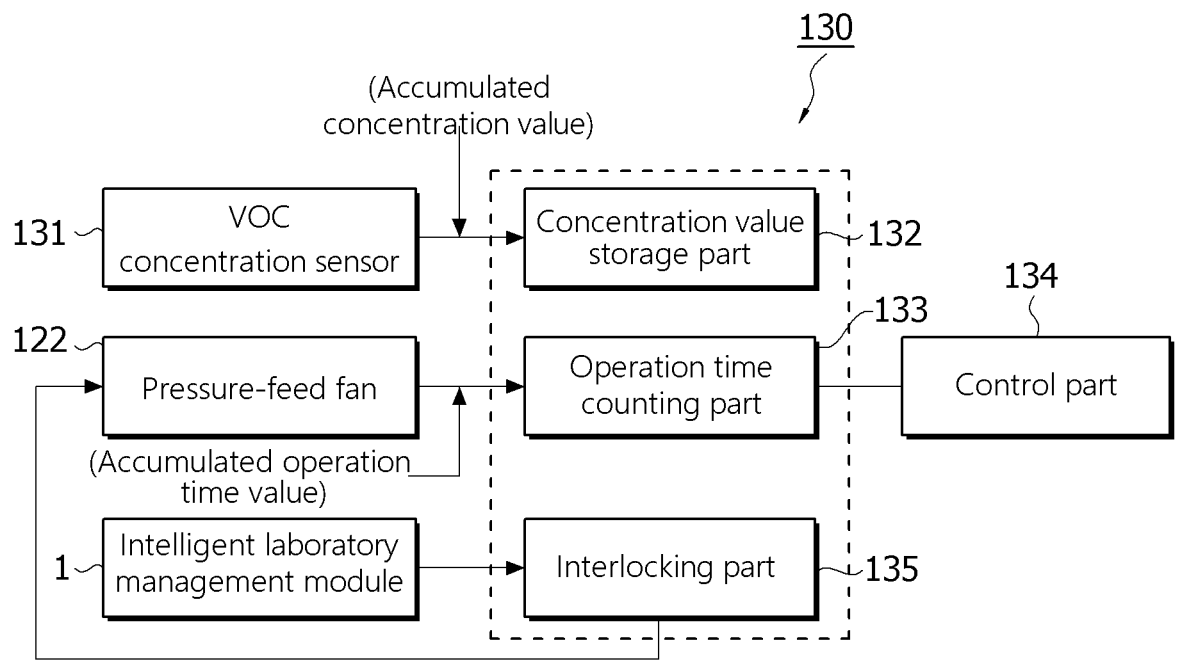

HAZARDOUS GAS PURIFICATION DEVICE WITH BUILT-IN PURIFICATION SYSTEM

RELATED APPLICATION

This application claims the benefit of priority of Korean Patent Application No. 10-2022-0011574 filed on Jan. 26, 2022, the contents of which are incorporated by reference as if fully set forth herein in their entirety.

FIELD AND BACKGROUND OF THE INVENTION

The present invention relates to a hazardous gas purification device, and more particularly, relates to a hazardous gas purification device with a built-in purification system in which the purification system is modularized so that it can be installed interchangeably between a stand type and a mobile type.

In laboratories, or laboratories or workspaces that carry out specific experiments with various chemical substances or manufacture products, and the like, there are many types of chemical substances, and various experiments are conducted, so that hazardous substances can be gasified and the air can be polluted, and the experimenters can cause health problems, when exposed to hazardous substances even in a small amount.

In addition, the gasified hazardous chemical substances can act as causes that can cause accidents such as fire or explosion, and can cause cross-contamination on various data to be analyzed, and bad factor, which are gasified in the atmosphere of laboratories or workspaces, are not purified outside through the duct, but also remain indoors and accumulate.

Most of these hazardous substances are fine dust, carbon dioxide, formaldehyde, volatile organic compounds, and the like, but in laboratories, where strong acids such as nitric acid and sulfuric acid are used, of many laboratories or workplaces, and the like, they are exposed to more dangerous situations.

In order to solve these problems, the present applicant has applied for Korean Patent Application No. 10-2013-0054579 (Activated carbon filter module and hazardous gas purification and neutralization device having the same) and Korean Patent Application No. 10-2009-0013526 (Hazardous gas purification and neutralization device). The former patent is a stand-type purification device, and the latter patent is a mobile-type purification device.

The stand-type purification device is used while being fixed at a predetermined position due to morphological characteristics of its long vertical length, and the mobile-type purification device is easy to move due to its relatively short vertical length, so that it is moved to a position where purification is required, and used.

Here, the stand-type purification device and the mobile-type purification device have a difference in vertical length, so that in proportion to this, there is a difference in the size and configuration of filters installed in each inside. Therefore, from the standpoint of the filter manufacturer, since the stand-type filter and the mobile-type filter must be separately produced, there is a disadvantage in manufacturing, such as provision of separate facilities for manufacturing each filter, and as a result, production costs have been also forced to increase.

SUMMARY OF THE INVENTION

The present invention is intended to solve the above-described conventional problems, where it is one object of the present invention to provide a hazardous gas purification device with a built-in purification system in which the purification system is modularized so that it can be installed interchangeably between a stand type and a mobile type.

It is a second object of the present invention to provide a hazardous gas purification device with a built-in purification system which can extend a filter life-span by applying a three-dimensional filter with a four-way filtration structure to a filter primarily filtering out volatile hazardous substances so that hazardous gases are dispersed and filtered in each direction, and can simultaneously attenuate air volumes and wind speed resistance.

It is a third object of the present invention to provide a hazardous gas purification device with a built-in purification system which accurately predicts a life-span of an organic compound filtration filter by a life-span prediction module so that a user can recognize a replacement time in advance.

It is a fourth object of the present invention to provide a hazardous gas purification device with a built-in purification system which is interlocked with an intelligent laboratory management module so that a reagent is withdrawn from a reagent storage device and simultaneously a pressure-feed fan is operated.

The technical objects to be achieved by the present invention are not limited to the technical objects mentioned above, and other technical objects which are not mentioned can be clearly understood by those having ordinary knowledge in the technical field to which the present invention belongs from the following descriptions.

In the present invention for achieving the above objects, a hazardous gas purification device with a built-in purification system is provided, which comprises a body case provided with an intake port for sucking hazardous gas on the upper side, provided with an exhaust port for discharging purified air to the outside on the lower side, and provided with an accommodating part provided between the intake port and the exhaust port on the inside; a pre-filter for filtering out large particles of dust and foreign substances contained in the hazardous gas introduced through the intake port; and a modular purification system, in a state of being installed in the accommodating part, for sterilizing viruses while filtering hazardous substances and fine particulate foreign substances contained in the hazardous gas introduced through the intake port, wherein the purification system consists of a three-dimensional filter for three-dimensionally filtering volatile organic compounds contained in the hazardous gas passed through the pre-filter from four directions; a pressure-feed fan, in a state of being disposed below the three-dimensional filter, for sucking hazardous gas through the intake port and forcibly discharging purified air through the exhaust port; a UV lamp disposed below the pressure-feed fan and for irradiating the pressure-feed fan and the hazardous gas with ultraviolet rays to sterilize harmful viruses; a HEPA filter disposed below the UV lamp and for filtering fine particles in the hazardous gas that is not filtered by the pre-filter; and a flat plate filter disposed below the HEPA filter and for filtering the remaining amount of volatile organic compounds that are not filtered by the three-dimensional filter.

Preferably, the body case comprises any one of a stand type which is fixed to a certain place and used, and a mobile type which is used by moving the position, and has a lower height than the stand type, wherein the purification system can be installed interchangeably in the stand-type or mobile-type accommodating part.

Preferably, the stand-type intake port is provided on the front face and both sides of the upper side, and the exhaust port is provided on the front face and both sides of the lower side, and the mobile-type intake port is provided on the top face, and the exhaust port is provided on the front face and both sides of the lower side, wherein a bellows tube may be connected to the intake port, and a trumpet-shaped tube may be connected to the end of the bellows tube.

Preferably, the three-dimensional filter is composed of a filter case and a filter filtering medium embedded in the filter case, wherein the filter case may comprise a rectangular frame-shaped inner tube having a plurality of pores formed on each side; a rectangular frame-shaped outer tube, in a state of having a larger outer diameter than the inner tube, disposed to be spaced apart from each other on the outside of the inner tube and having a plurality of pores formed on each side; a top plate hermetically covering the open upper portions of the inner tube and the outer tube; and a lower plate coupled to the lower portions of the inner tube and the outer tube, but sealing the section between the inner tube and the outer tube, and opening the inner peripheral surface region of the inner tube, and the filter filtering medium may be embedded in a space spaced apart from the inner tube and the outer tube.

Preferably, the filter filtering medium of the three-dimensional filter and the flat plate filter is made by mixing an activated carbon filter filtering medium and an inorganic oxide filter filtering medium in a weight ratio of 1 to 10:10 to 1, where the activated carbon filter filtering medium may have a specific surface area of 200 to 1000 $m^2/g$, and the inorganic oxide filter filtering medium may have a pore size of 0.03 to 0.9 μm.

Preferably, it further comprises a life-span prediction module for predicting the life-span of the three-dimensional filter and the flat plate filter, wherein the life-span prediction module may be composed of a VOC concentration sensor for sensing, in a state of being installed at the outlet side of the three-dimensional filter and the flat plate filter, concentrations of volatile organic compounds contained in the air passing through each filter in real time; a concentration value storage part for storing the accumulated concentration value of the volatile organic compound transmitted from the VOC concentration sensor; an operation time counting part for cumulatively counting the operation time of the pressure-feed fan; and a control part for comparing the collected value of the accumulated concentration value and the accumulated operation time value transmitted from the concentration value storage part and the operation time counting part with a preset threshold value to calculate the remaining life-span value.

Preferably, the life-span prediction module may further comprise: a display part for graphically outputting the remaining life-span value, or converting it into a remaining life-span date and outputting it as a number; and a warning light or an alarm speaker for warning when the collected value approaches the remaining life-span value.

Preferably, the remaining life-span value calculated by the control part may be transmitted to the manager PC or the manager mobile phone through the communication module.

Preferably, the life-span prediction module further comprises an interlocking part for interlocking with an intelligent laboratory management module for managing reagents stored in the reagent storage device of the laboratory, wherein when the interlocking part receives a signal that the reagent has been withdrawn from the reagent storage device, it is possible to transmit a start signal so that the pressure-feed fan is operated.

Preferably, the intelligent laboratory management module may discriminate the type of the withdrawn reagent and transmit the signal to the interlocking part, and the interlocking part may control the RPM of the pressure-feed fan according to the signal.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a hazardous gas purification device according to the present invention, which is a perspective diagram in a state where the body case is cut off and the three-dimensional filter is separated.

FIG. 2 is a hazardous gas stream diagram of a hazardous gas purification apparatus according to the present invention.

FIG. 3 is a schematic diagram showing the configuration of a purification system according to the present invention.

FIG. 4 is an exploded perspective diagram of a filter case of a purification system according to the present invention.

FIG. 5 is a top cross-sectional diagram of FIG. 4.

FIG. 6 is a block diagram of a life-span prediction module according to the present invention.

DESCRIPTION OF SPECIFIC EMBODIMENTS OF THE INVENTION

The present invention may be embodied in several different forms, and thus is not limited to the examples described herein. Then, in order to clearly explain the present invention, parts irrelevant to the description are omitted in the drawings, and similar reference numerals have been assigned to similar parts throughout the specification.

Throughout the specification, when a part is "linked (connected, contacted, coupled)" with another part, this includes not only the case of being "directly linked" but also the case of being "indirectly linked" with another member interposed therebetween. In addition, when a part "includes" a certain component, this means that other components may be further provided without excluding other components unless otherwise stated.

The terms used herein are used only to describe specific examples, and are not intended to limit the present invention. The singular expression includes the plural expression unless the context clearly dictates otherwise. In this specification, the term such as "comprise" or "have" is intended to designate that a feature, number, step, operation, component, part, or combination thereof described in the specification exists, but it should be understood that the presence or addition possibility of one or more other features, numbers, steps, operations, components, parts, or combinations thereof are not excluded in advance.

Hereinafter, examples of the present invention will be described with reference to the accompanying drawings.

FIG. 1 as attached is a hazardous gas purification device according to the present invention, which is a perspective diagram in a state where the body case is cut off and the three-dimensional filter is separated, FIG. 2 is a hazardous gas stream diagram of a hazardous gas purification apparatus according to the present invention, FIG. 3 is a schematic diagram showing the configuration of a purification system according to the present invention, FIG. 4 is an exploded perspective diagram of a filter case of a purification system according to the present invention, FIG. 5 is a top cross-sectional diagram of FIG. 4, and FIG. 6 is a block diagram of a life-span prediction module according to the present invention.

As shown in the accompanying drawings, the hazardous gas purification device with a built-in purification system (hereinafter, abbreviated as 'hazardous gas purification device') (100) is for effectively purifying and neutralizing hazardous gases such as volatile organic compounds, odors and fumes generated upon performing research works or producing products in laboratories, research chambers, chemical product production facilities, hospitals, and the like.

The hazardous gas purification device (100) according to the present invention may be divided into a stand type and a mobile type according to an installation type. The stand type has a long vertical length, so it may be used in a state of being fixed and disposed at a specific location, and the mobile type has a relatively short vertical length and is equipped with wheels, so that it may be moved to a desired location and used.

The hazardous gas purification device (100) of the present invention is characterized in that the purification system mounted therein is modularized and configured so that it can be used in common, regardless of the type of stand type or mobile type, and the like.

To this end, the hazardous gas purification device (100) of the present invention may comprise a body case (110) and a modular purification system (120).

The body case (110) may be provided with an intake port (111) for sucking hazardous gas on the upper side, may be provided with an exhaust port (112) for discharging purified air to the outside (indoor) on the lower side, and may be provided with an accommodating part (113) for accommodating the purification system (120) between the intake port (111) and the exhaust port (112) inside.

As the body case (110), a stand type case having a long vertical length may be applied, or a mobile type having a relatively short vertical length may be applied, according to the type. In this example, regardless of the type of the body case (110) as described above, the size of the accommodating part (113) is the same, and the purification system (120) accommodated therein is also generalized to have the same size and configuration.

Therefore, unlike the past in which the size and configuration of the purification system varied according to the type of the body case (110), the purification system is universally modularized, whereby the productivity can be improved, and the production costs can be reduced.

Among the body case (110), in the case of the stand type, as in the left drawings of FIGS. 1 and 2, three-way intake ports (111) may be provided on the front face and both sides of the upper side, and the three-way exhaust ports (112) may be provided on the front face and both sides of the lower side.

Among the body case (110), in the case of the mobile type, as in the right drawings of FIGS. 1 and 2, an intake port (111) is provided on the top face, and three-way exhaust ports (112) are provided on the front face and both sides of the lower side.

Here, a bellows tube (114) may be connected to the mobile-type intake port (111), and a trumpet-shaped tube (115) may be connected to the end of the bellows tube.

Meanwhile, a pre-filter (116) for filtering out large particles of dust and foreign substances contained in the hazardous gas introduced through the intake port may be installed between the intake port (111) and the purification system (120) in the body case (110). The pre-filter (116) may be included as one component of the filter module (120), but it is difficult to integrate in reality because it is spatially separated from the purification system (120). However, if it is accompanied by structural improvement that can be integrated, it is preferable that it is included in the purification system (120).

The purification system (120) serves, in a state of being installed in the accommodating part (113), to filter hazardous substances and fine particulate foreign substances contained in the hazardous gas introduced through the intake port (111), and in this example, the purification system (120) has an advantage that it can be installed interchangeably in a stand type or a mobile type by unifying it so that the size and configuration are the same. For unification, the method of stacking and disposing the following elements in one frame is the most efficient, but is not limited thereto.

Such a purification system (120) may be composed of a three-dimensional filter (121) for three-dimensionally filtering volatile organic compounds contained in the hazardous gas passing through the pre-filter (116) in four directions, and a pressure-feed fan (122), in a state of being disposed below the three-dimensional filter, for sucking hazardous gas through the intake port (111) and forcibly discharging purified air through the exhaust port (112), and a UV lamp (123) which is disposed below the pressure-feed fan and irradiated with ultraviolet rays to sterilize harmful viruses, and a HEPA filter (124) disposed below the UV lamp and for filtering fine particles in the hazardous gas which is not filtered by the pre-filter (116), and a flat plate filter (125) disposed below the HEPA filter and for filtering the remaining amounts of the volatile organic compounds which are not filtered by the three-dimensional filter (121).

The three-dimensional filter (121) may be composed of a filter case (121a) and a filter filtering medium (121b) embedded in the filter case.

As shown in FIGS. 4 and 5, the filter case (121a) may be composed of a rectangular frame-shaped inner tube (121a-1) having a plurality of pores (121a-2) formed on each side, and a rectangular frame-shaped outer tube (121a-3), in a state of having a larger outer diameter than the inner tube, disposed to be spaced apart from each other on the outside of the inner tube and having a plurality of pores (121a-4) formed on each side, and a top plate (121a-5) hermetically covering the open upper portions of the inner tube (121a-1) and the outer tube (121a-3), and a lower plate (121a-6) coupled to the lower portions of the inner tube (121a-1) and the outer tube (121a-3), but sealing the section between the inner tube and the outer tube, and opening (121a-7) the inner peripheral surface region of the inner tube.

The filter filtering medium (121b) may be embedded in a powder form between the spaces (s) of the inner tube (121a-1) and the outer tube (121a-3). Here, it will be natural that the filter medium powder becomes larger than the pore diameter of the pores of the inner tube and the outer tube.

Since the above-described three-dimensional filter (121) is capable of filtering on all front, rear, left and right sides, hazardous gases are introduced from four directions to three-dimensionally filter the volatile organic compounds contained in the hazardous gases. In particular, as the hazardous gas is filtered in a state of being dispersed in each direction, the life-span of the filter can be extended, and favorable conditions for attenuating the air volume and wind speed resistance are provided.

The filter filtering medium of the three-dimensional filter (121) and the flat plate filter (125) is for filtering volatile organic compounds in common, which may be made by mixing the activated carbon filter filtering medium and the inorganic oxide filter filtering medium in a weight ratio of 1 to 10:10 to 1.

The activated carbon filter filtering medium comprises a support that hollow portions and pores are formed, where the support may have a specific surface area of 200 to 1000 $m^2/g$, and the inorganic oxide filter filtering medium also comprises a support that hollow portions and pores are formed, where the pores may have a size of 0.03 to 0.9 μm.

In this way, as the supports of the activated carbon filter filtering medium and the inorganic oxide filter filtering medium are subjected to hollow fiber treatment, the surface area to which hazardous gases react can be improved, the reaction active point can be increased, and it helps save energy by reducing the pressure loss (300 Pa or more, in order to maintain a control wind speed of 0.4 m/s or more).

As shown, the flat plate filter (125) may be installed horizontally to form a right angle with respect to the course direction of the hazardous gas, or alternatively, it may also be sidling installed to form an acute angle with the course direction of the hazardous gas.

The three-dimensional filter (121) and the flat plate filter (125) according to the above example have an average purification efficiency of 97% or more for four or more major pollutants such as acetaldehyde ($CH_3CHO$), toluene ($C_7H_8$), and formaldehyde ($CH_2O$).

The pressure-feed fan (122) serves, in a stage of being disposed below the three-dimensional filter (121), to suck the hazardous gas in the room to be introduced through the intake port (111), and to forcibly pressure-feed it to be exhausted to the exhaust port (112) via the filter module (120).

As the pressure-feed fan (122), an axial stream fan or a centrifugal fan may be applied, and may be selectively applied according to the path of the hazardous gas.

As the UV lamp (123), an 8 W class UVC LED may be used, and one with a wavelength range of 200 to 280 nm may be used. In this case, the virus removal ratio will exceed 97%. For reference, the virus removal ratio should be 97% or more as a result value confirmed by reacting two viral liquids that influenza A viruses are diluted.

Meanwhile, the hazardous gas purification device (100) according to the present invention may further comprise a life-span prediction module (130) for predicting the life-span of the three-dimensional filter (121) and the flat plate filter (125).

The life-span prediction module (130) may be composed of a VOC concentration sensor (131) for sensing, in a state of being installed at each outlet side of the three-dimensional filter (121) and the flat plate filter (125), concentrations of volatile organic compounds contained in the air passing through each filter in real time, and a concentration value storage part (132) for storing the accumulated concentration value of the volatile organic compound transmitted from the VOC concentration sensor, and an operation time counting part (133) for cumulatively counting the operation time of the pressure-feed fan (122), and a control part (134) for comparing the collected value of the accumulated concentration value and the accumulated operation time value transmitted from the concentration value storage part (132) and the operation time counting part (133) with a preset threshold value to calculate the remaining life-span value.

For example, the threshold value is multiplied by the concentration value and the operating time to designate the maximum life-span value, and the accumulated values by the concentration value storage part (132) and the operation time counting part (133) are collected and compared with the threshold value, so that the remaining life-span value can be calculated.

Here, the remaining life-span value may be graphed and output through a display part (not shown), or the remaining life-span value may be converted into the remaining life-span date and output through the display part. The display part can be installed anywhere on the surface of the body case (110), but it is preferable to install it where the user can visually see it.

The remaining life-span value calculated by the control part (134) may be transmitted to the manager PC or the manager mobile phone through the communication module. Accordingly, even if the manager is not located near the hazardous gas purification device (100), it is possible to manage the life-span of the three-dimensional filter (121) and the flat plate filter (125) from a long distance.

Furthermore, in the hazardous gas purification device (100) according to the present invention, a warning light or a mars light may be further installed such that it may warn the user when the accumulated value approaches the threshold value.

The life-span prediction module (130) may further comprise an interlocking part (135) for interlocking with an intelligent laboratory management module (1) for managing reagents stored in the reagent storage device of the laboratory where the hazardous gas purification device (100) according to the present invention is installed.

When receiving a signal that the reagent has been withdrawn from the reagent storage device, the interlocking part (135) may control the pressure-feed fan to automatically operate by transmitting a start signal to operate the pressure-feed fan (122).

Here, the intelligent laboratory management module (1) may discriminate the type of the withdrawn reagent and transmit the signal to the interlocking part (135), and the interlocking part may control the RPM of the pressure-feed fan (130) according to the signal.

That is, various types of reagents are stored in the reagent storage device, where considering that the respective reagents have differences in the amount and toxicity of hazardous gas generated during experiment procedures, data on the hazardous gas generation amounts and toxicity for each reagent is saved in the control part (134) in advance.

From this, when a signal indicating that a specific reagent has been withdrawn from the intelligent laboratory management module (1) is transmitted to the interlocking part (135), the control part (134) controls the rotational speed of the pressure-feed fan (122) to be fast or slow based on the hazardous gas generation amount and toxicity data of the reagent saved therein in advance. Accordingly, it is possible to prevent the remaining hazardous gas during the experiment from being introduced to the experimenter or the inside of the laboratory in advance as the pressure-feed fan (122) is automatically adjusted according to the reagent without the need for the experimenter to artificially control it. This is a necessary configuration in terms of safety.

Meanwhile, here, it has been described that the RPM of the pressure-feed fan (122) is automatically adjusted according to the type of reagent, but is not limited thereto, and the experimenter arbitrarily manipulates the operation button (not shown) provided on the outside of the body case (110), whereby it is also possible to manually adjust the RPM of the pressure-feed fan (122).

As is apparent from the above, According to the above-described technical solutions, the present invention unifies the standard and configuration of the purification system, whereby it can be installed interchangeably in a tall stand-type purification device and a short mobile-type purification device, thereby improving productivity and lowering the production cost.

Also, a three-dimensional filter with a four-way filtration structure is applied to a filter primarily filtering out volatile hazardous substances, whereby hazardous gases are dispersed in each direction and filtered, so that the present invention can attenuate air volumes and wind speed resistance while extending the life-span of the filter.

In addition, the present invention accurately predicts the life-span of the organic compound filtration filter and informs the user, whereby the delay of the filter replacement can be prevented and the reliability of filter management can be improved.

Furthermore, as it is interlocked with the intelligent laboratory management module, the present invention provides convenience to the experimenter by automatically operating the pressure-feed fan at the same time while the reagent is withdrawn from the reagent storage device, and as the rotational speed of the pressure-feed fan is automatically adjusted according to the type of reagent, the reliability of safety can be improved.

The effects of the present invention are not limited to the above-described effects, and it should be understood to include all effects that can be inferred from the configurations of the inventions described in the detailed description or claims of the present invention.

REFERENCES

100: hazardous gas purification device
110: body case
111: intake port
112: exhaust port
113: accommodating part
116: pre-filter
120: purification system
121: three-dimensional filter
121a: filter case
121a-1: inner tube
121a-3: outer tube
121a-5: top plate
121a-6: lower plate
121b: filter filtering medium
122: pressure-feed fan
123: UV lamp
124: HEPA filter
125: flat plate filter
130: life-span prediction module

What is claimed is:

1. A hazardous gas purification device with a built-in purification system comprising:
a body case provided with an intake port for sucking hazardous gas on an upper side, provided with an exhaust port for discharging purified air to the outside on a lower side, and provided with an accommodating part provided between the intake port and the exhaust port on the inside;
a pre-filter for filtering out large particles of dust and foreign substances contained in the hazardous gas introduced through the intake port; and
a modular purification system, in a state of being installed in the accommodating part, for sterilizing viruses while filtering hazardous substances and fine particulate foreign substances contained in the hazardous gas introduced through the intake port, wherein the purification system consists of:
a three-dimensional filter for three-dimensionally filtering volatile organic compounds contained in the hazardous gas passed through the pre-filter from four directions;
a pressure-feed fan, in a state of being disposed below the three-dimensional filter, for sucking hazardous gas through the intake port and forcibly discharging purified air through the exhaust port;
a UV lamp disposed below the pressure-feed fan and for irradiating the pressure-feed fan and the hazardous gas with ultraviolet rays to sterilize harmful viruses;
a HEPA filter disposed below the UV lamp and for filtering fine particles in the hazardous gas that is not filtered by the pre-filter; and
a flat plate filter disposed below the HEPA filter and for filtering the remaining amount of volatile organic compounds that are not filtered by the three-dimensional filter,
wherein the three-dimensional filter is composed of a filter case and a filter filtering medium embedded in the filter case,
wherein the filter case comprises a rectangular frame-shaped inner tube having a plurality of pores formed on each side; a rectangular frame-shaped outer tube, in a state of having a larger outer diameter than the inner tube, disposed to be spaced apart from each other on the outside of the inner tube and having a plurality of pores formed on each side; a top plate hermetically covering the open upper portions of the inner tube and the outer tube; and a lower plate coupled to the lower portions of the inner tube and the outer tube, but sealing the section between the inner tube and the outer tube, and opening the inner peripheral surface region of the inner tube, and
wherein the filter filtering medium is embedded in a space spaced apart from the inner tube and the outer tube.

2. The hazardous gas purification device with a built-in purification system according to claim 1, characterized in that
the body case comprises any one of a stand type which is fixed to a certain place and used, and a mobile type which is used by moving the position, and has a lower height than the stand type, wherein
the purification system is installed interchangeably in the stand-type or mobile-type accommodating part.

3. The hazardous gas purification device with a built-in purification system according to claim 2, characterized in that
the stand-type intake port is provided on a front face and both sides of the upper side, and the exhaust port is provided on the front face and both sides of the lower side, and
the mobile-type intake port is provided on a top face, and the exhaust port is provided on the front face and both sides of the lower side, wherein a bellows tube is connected to the intake port, and a trumpet-shaped tube is connected to the end of the bellows tube.

4. The hazardous gas purification device with a built-in purification system according to claim 1, characterized in that
the filter filtering medium of the three-dimensional filter and the flat plate filter is made by mixing an activated carbon filter filtering medium and an inorganic oxide filter filtering medium in a weight ratio of 1 to 10:10 to 1, where the activated carbon filter filtering medium has a specific surface area of 200 to 1000 m²/g, and the inorganic oxide filter filtering medium has a pore size of 0.03 to 0.9 μm.

5. The hazardous gas purification device with a built-in purification system according to claim 1, characterized by further comprising a life-span prediction module for predicting the life-span of the three-dimensional filter and the flat plate filter, wherein the life-span prediction module is composed of:

a VOC concentration sensor for sensing, in a state of being installed at the outlet side of the three-dimensional filter and the flat plate filter, concentrations of volatile organic compounds contained in the air passing through each filter in real time;

a concentration value storage part for storing the accumulated concentration value of the volatile organic compound transmitted from the VOC concentration sensor;

an operation time counting part for cumulatively counting the operation time of the pressure-feed fan; and a control part for comparing the collected value of the accumulated concentration value and the accumulated operation time value transmitted from the concentration value storage part and the operation time counting part with a preset threshold value to calculate the remaining life-span value.

6. The hazardous gas purification device with a built-in purification system according to claim 5, characterized in that the life-span prediction module further comprises:

a display part for graphically outputting the remaining life-span value, or converting it into a remaining life-span date and outputting it as a number; and a warning light or an alarm speaker for warning when the collected value approaches the remaining life-span value.

7. The hazardous gas purification device with a built-in purification system according to claim 5, characterized in that the remaining life-span value calculated by the control part is transmitted to a manager PC or a manager mobile phone through a communication module.

8. The hazardous gas purification device with a built-in purification system according to claim 5, characterized in that the life-span prediction module further comprises an interlocking part for interlocking with an intelligent laboratory management module for managing reagents stored in a reagent storage device of a laboratory, wherein when the interlocking part receives a first signal that at least one reagent has been withdrawn from the reagent storage device, a start signal is transmitted so that the pressure-feed fan is operated.

9. The hazardous gas purification device with a built-in purification system according to claim 8, characterized in that the intelligent laboratory management module discriminates a type of the at least one reagent and transmits a second signal signal to the interlocking part, and the interlocking part controls an revolutions per minute (RPM) of the pressure-feed fan according to the second signal.

* * * * *